US012090788B1

(12) United States Patent
Fattouche

(10) Patent No.: US 12,090,788 B1
(45) Date of Patent: Sep. 17, 2024

(54) FLEXIBLE WHEEL COVER OVERLAY WITH EXTENDED SURROUND

(71) Applicant: Neo Design, LLC, Bowie, MD (US)

(72) Inventor: Naje Fattouche, Bowie, MD (US)

(73) Assignee: Neo Design, LLC, Bowie, MD (US)

( * ) Notice: Subject to any disclaimer, the term of this patent is extended or adjusted under 35 U.S.C. 154(b) by 0 days.

(21) Appl. No.: 18/626,469

(22) Filed: Apr. 4, 2024

Related U.S. Application Data

(60) Provisional application No. 63/609,027, filed on Dec. 12, 2023.

(51) Int. Cl.
   - *B60B 7/08* (2006.01)
   - *B60B 7/00* (2006.01)
   - *B60B 7/10* (2006.01)

(52) U.S. Cl.
   CPC .............. *B60B 7/08* (2013.01); *B60B 7/0066* (2013.01); *B60B 7/10* (2013.01)

(58) Field of Classification Search
   CPC ......... B60B 7/0066; B60B 7/02; B60B 7/065; B60B 7/08; B60B 7/10
   See application file for complete search history.

(56) References Cited

U.S. PATENT DOCUMENTS

| | | | | |
|---|---|---|---|---|
| 3,355,219 A * | 11/1967 | Henry | ..................... | B60B 7/063 301/37.34 |
| 5,803,552 A * | 9/1998 | Kato | ..................... | B60B 7/066 301/37.41 |
| 6,517,168 B1 | 2/2003 | Van Houten | | |
| 7,314,255 B2 * | 1/2008 | Wang | ..................... | B60B 7/10 301/37.102 |
| 7,452,037 B1 * | 11/2008 | Nunes | ..................... | B60B 7/08 301/37.31 |
| 7,510,248 B2 * | 3/2009 | Wang | ..................... | B60B 7/10 301/37.28 |
| 7,997,663 B2 * | 8/2011 | Zaniboni | ..................... | B60B 7/08 301/37.42 |
| 8,342,613 B2 * | 1/2013 | Russell | ..................... | B60B 5/02 301/37.12 |
| 9,227,463 B2 * | 1/2016 | Hsieh | ..................... | B60B 7/065 |
| 11,254,160 B2 * | 2/2022 | Fattouche | ................ | B60B 7/08 |
| 11,453,236 B2 * | 9/2022 | Fattouche | ............... | B60B 7/065 |
| 11,472,227 B2 * | 10/2022 | Fattouche | ............. | B60B 7/0046 |

(Continued)

*Primary Examiner* — Jason R Bellinger
(74) *Attorney, Agent, or Firm* — Sisson & Banyas, Attorneys at Law, LLC; Jeffrey J. Banyas

(57) ABSTRACT

A snap-on wheel cover overlay made of a flexible material includes a peripheral boundary defining an inner surface and an outer surface, a surround extending from the peripheral boundary, a plurality of spokes and a plurality of openings, and a plurality of clasp mechanism pairs. Each opening of the plurality of openings passes from the outer surface through the inner surface and is located between each successive spoke of the plurality of spokes. The plurality of clasp mechanism pairs extends from the inner surface with a first clasp mechanism located on a first edge of one spoke and a second clasp mechanism located on a second edge of a succeeding spoke. The wheel cover overlay is capable of forming a first degree of curvature greater than 2.0° for a 10 cm first arc length of a first arc of a circle having a center point on a line extending from a central vertical axis of the wheel cover overlay and arcing away from a central horizontal axis of the wheel cover overlay.

20 Claims, 11 Drawing Sheets

(56) References Cited

U.S. PATENT DOCUMENTS

| | | |
|---|---|---|
| 2007/0096545 A1 | 5/2007 | Wang |
| 2013/0278043 A1 | 10/2013 | Wang |
| 2018/0072094 A1* | 3/2018 | Hsieh .................... B60B 7/0013 |
| 2019/0030948 A1* | 1/2019 | Wang ........................ B60B 7/08 |

* cited by examiner

FLEXIBLE WHEEL COVER OVERLAY WITH EXTENDED SURROUND

CROSS REFERENCES AND PRIORITIES

This application claims priority from U.S. Provisional Application No. 63/609,027 filed on 12 Dec. 2023, the teachings of which are incorporated by reference herein in their entirety. International Application No. PCT/US2024/022996 filed on 4 Apr. 2024 and this Application claim common priority to U.S. Provisional Application No. 63/609,027.

BACKGROUND

Aftermarket components are typically used to enhance automobile cosmetics and/or repair or replace damaged original automotive equipment. One such component is an automobile wheel cover overlay which fits over the manufacturer's (or another aftermarket) installed automobile wheel and provides a customized appearance.

Automobile wheel cover overlays are typically custom manufactured to precisely fit over a specific wheel of a specific vehicle. Commonly, aftermarket automobile wheel cover overlays are finished in a chrome, black, or other colored finish, thus providing a new look to the automobile upon which the wheel cover overlay is installed.

Many wheel covers utilize clips, integral legs, snap tabs, protruding strips, and/or adhesives that are prone to failure and lead to the wheel cover overlay separating from the vehicle wheel and/or a previously damaged hub cap. For example, U.S. Pat. No. 6,517,168 to Van Houten teaches a wheel cover assembly with pocket inserts fastened to the wheel cover using an integral snap tab arrangement including integral snap tabs that extend in an inboard direction from the inboard surface of the wheel cover and that are disposed around each turbine pocket.

Another example is disclosed in United States Patent Publication No. 2007/0096545 to Wang which teaches a wheel rim covering structure with costal bodies and engraved holes with shrinking hole edge equipped with a plastic made fastener assembly having a suitable length stem.

Still another example is disclosed in U.S. Pat. No. 7,510,248 to Wang which teaches a wheel rim cover mounting structure having a plurality of equiangularly spaced through holes, a plurality of protruding flanges perpendicularly protruded from the back side of the cover body around the border of each of the through holes and a plurality of plugholes respectively provided at two sides of each of the protruding flanges, etc.

Yet another example is disclosed in United States Patent Publication No. 2013/0278043 to Wang which teaches an automobile wheel rim cover having a plurality of mounting holes, a plurality of through holes cut through opposing front and back walls of a cover body thereof corresponding to the mounting holes of the steel wheel, a plurality of upright flanges protruding from the back wall of the cover body around the through holes, a plurality of beveled retaining devices protruding from an outer wall of each upright flange and insertable with the respective upright flanges through the mounting holes of the steel wheel for hooking on a back wall of the rim of the steel wheel.

Finally, U.S. Pat. No. 9,227,463 to Hsieh teaches an adjustable wheel cover for aluminum alloy rim wherein a peripheral wall is extended axially from an inner surface of the wheel cover and along a periphery of each through hole with an assembly part disposed with a plurality of adjustment holes radially and a locking block on a spring of the fixing part secured in the adjustment hole correspondingly.

Many attempts have been made to solve the separation issues resulting from the prior art clips, integral legs, snap tabs, protruding strips, and/or adhesives. One such attempt is found in U.S. Pat. No. 11,254,160 to Fattouche—the teachings of which are incorporated by reference herein in their entirety—which teaches a snap-on automotive wheel cover overlay with extended surround having hook-shaped members for the purpose of securing the wheel cover overlay.

Still, the prior art wheel cover overlays can be prone to breakage during installation and operation. The need exists, therefore, for an improved automobile wheel cover overlay which reduces or eliminates breakage during installation and operation.

SUMMARY

Described herein is a wheel cover overlay. The wheel cover overlay comprise a peripheral boundary, a surround, a plurality of spokes and a plurality of openings, and a plurality of clasp mechanism pairs. The peripheral boundary defines an inner surface and an outer surface. The surround extends from the peripheral boundary. Each opening of the plurality of openings passes from the outer surface through the inner surface and is located between successive spokes of the plurality of spokes. The plurality of clasp mechanism pairs extends from the inner surface with a first clasp mechanism of each clasp mechanism pair located on a first edge of one spoke and a second clasp mechanism of each clasp mechanism pair located on a second edge of a succeeding spoke. The wheel cover overlay is made of a flexible material and is capable of forming a first degree of curvature or first angle with at least one of two opposing sides of the wheel cover overlay arcing or bending away from a central horizontal axis of the wheel cover overlay upon application of two forces applied in the same direction about two points of the peripheral boundary along the central horizontal axis while an axis perpendicular to the central horizontal axis remains fixed in place. The two forces combined are in a range selected from the group consisting of between 20 N and 500 N, between 20 N and 400 N, between 20 N and 300 N, between 20 N and 200 N, between 20 N and 100 N, between 20 N and 50 N, between 50 N and 500 N, between 50 N and 400 N, between 50 N and 300 N, between 50 N and 200 N, and between 50 N and 100 N.

In some embodiments, the surround may be configured to extend past a circumferential edge of a wheel when the wheel cover overlay is attached to said wheel by the plurality of clasp mechanism pairs.

In certain embodiments, the wheel cover overlay may comprise a plurality of secondary spoke pairs and a plurality of secondary openings. Each secondary spoke may extend between a spoke terminal end and the peripheral boundary. Each secondary opening may pass from the outer surface through the inner surface and may be located between two opposing secondary spokes of a secondary spoke pair.

In some embodiments, the first clasp mechanism of each clasp mechanism pair may comprise a first tab extending inwardly from the first edge. Said first tab may comprise a first lip located at a first tab distal end. In certain embodiments, the second clasp mechanism of each clasp mechanism pair may comprise a second tab extending inwardly from the second edge. Said second tab may comprise a second lip located at a second tab distal end.

In certain embodiments, the wheel cover overlay may comprise a plurality of lug nut towers. Each lug nut tower of the plurality of lug nut towers may comprise a lug nut through hole.

In some embodiments, the wheel cover overlay may comprise a center rotation device configured to insert into a hole passing through the central vertical axis. The center rotation device may have a plurality of tension tabs which expand outwardly when the center rotation device is turned in a clockwise direction within a hole passing through the central vertical axis.

Also described herein is a wheel cover overlay. The wheel cover overlay comprise a peripheral boundary, a surround, a plurality of spokes and a plurality of openings, and a plurality of clasp mechanism pairs. The peripheral boundary defines an inner surface and an outer surface. The surround extends from the peripheral boundary. Each opening of the plurality of openings passes from the outer surface through the inner surface and is located between successive spokes of the plurality of spokes. The plurality of clasp mechanism pairs extends from the inner surface with a first clasp mechanism of each clasp mechanism pair located on a first edge of one spoke and a second clasp mechanism of each clasp mechanism pair located on a second edge of a succeeding spoke. The wheel cover overlay is made of a flexible material having a modulus of elasticity in a range selected from the group consisting of between 2,000 and 2,500 Mpa, between 2,000 and 2,400 Mpa, between 2,000 and 2,300 Mpa, and between 2,000 and 2,200 Mpa when measured at 2.8 mm/min according to ASTM D790-17.

In some embodiments, the surround may be configured to extend past a circumferential edge of a wheel when the wheel cover overlay is attached to said wheel by the plurality of clasp mechanism pairs.

In certain embodiments, the wheel cover overlay may comprise a plurality of secondary spoke pairs and a plurality of secondary openings. Each secondary spoke may extend between a spoke terminal end and the peripheral boundary. Each secondary opening may pass from the outer surface through the inner surface and may be located between two opposing secondary spokes of a secondary spoke pair.

In some embodiments, the first clasp mechanism of each clasp mechanism pair may comprise a first tab extending inwardly from the first edge. Said first tab may comprise a first lip located at a first tab distal end. In certain embodiments, the second clasp mechanism of each clasp mechanism pair may comprise a second tab extending inwardly from the second edge. Said second tab may comprise a second lip located at a second tab distal end.

In certain embodiments, the wheel cover overlay may comprise a plurality of lug nut towers. Each lug nut tower of the plurality of lug nut towers may comprise a lug nut through hole.

In some embodiments, the wheel cover overlay may comprise a center rotation device configured to insert into a hole passing through the central vertical axis. The center rotation device may have a plurality of tension tabs which expand outwardly when the center rotation device is turned in a clockwise direction within a hole passing through the central vertical axis.

DETAILED DESCRIPTION

Disclosed herein is a snap-on wheel cover overlay. As described herein and in the claims, the following numbers refer to the following structures as noted in the Figures.

- 10 refers to a wheel cover overlay.
- 12 refers to a central horizontal axis.
- 14 refers to a line.
- 16 refers to a central vertical axis.
- 20 refers to a first degree of curvature.
- 50 refers to a wheel.
- 52 refers to a wheel spoke.
- 55 refers to a circumferential edge (of a wheel).
- 57 refers to a tire.
- 100 refers to a peripheral boundary.
- 110 refers to an inner surface.
- 120 refers to an outer surface.
- 200 refers to a surround.
- 300 refers to a spoke.
- 310 refers to a first edge.
- 320 refers to a second edge.
- 400 refers to an opening.
- 500 refers to a clasp mechanism pair.
- 510 refers to a first clasp mechanism.
- 511 refers to a first tab.
- 512 refers to a first lip.
- 513 refers to a first tab distal end.
- 520 refers to a second clasp mechanism.
- 521 refers to a second tab.
- 522 refers to a second lip.
- 523 refers to a second tab distal end.
- 600 refers to a lug nut tower.
- 610 refers to a lug nut through hole.
- 700 refers to a center rotation device.
- 800 refers to a secondary spoke.
- 900 refers to a secondary opening.

Figure 1:
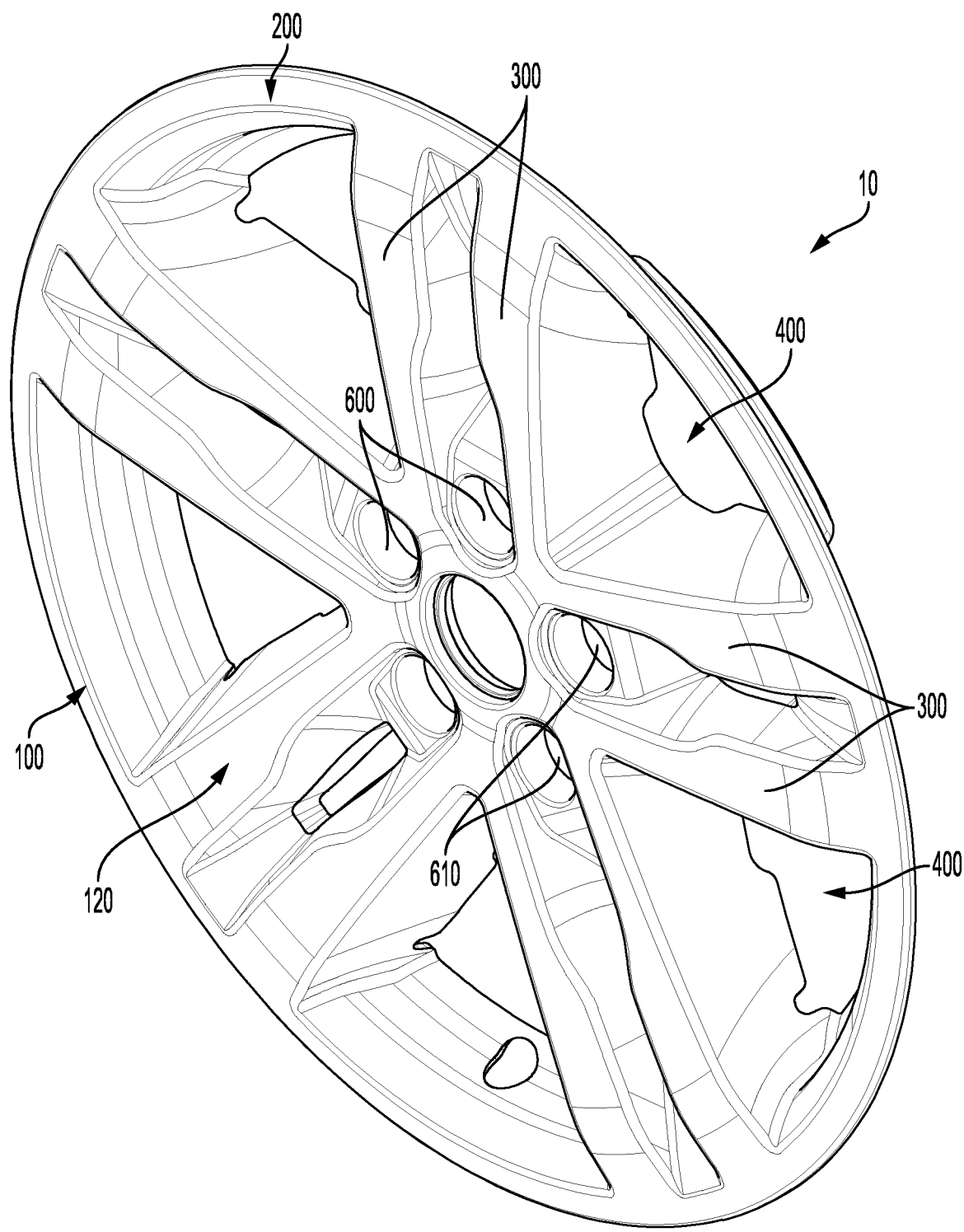
FIG. 1 is a front perspective view of a wheel cover overlay.
Figure 2:
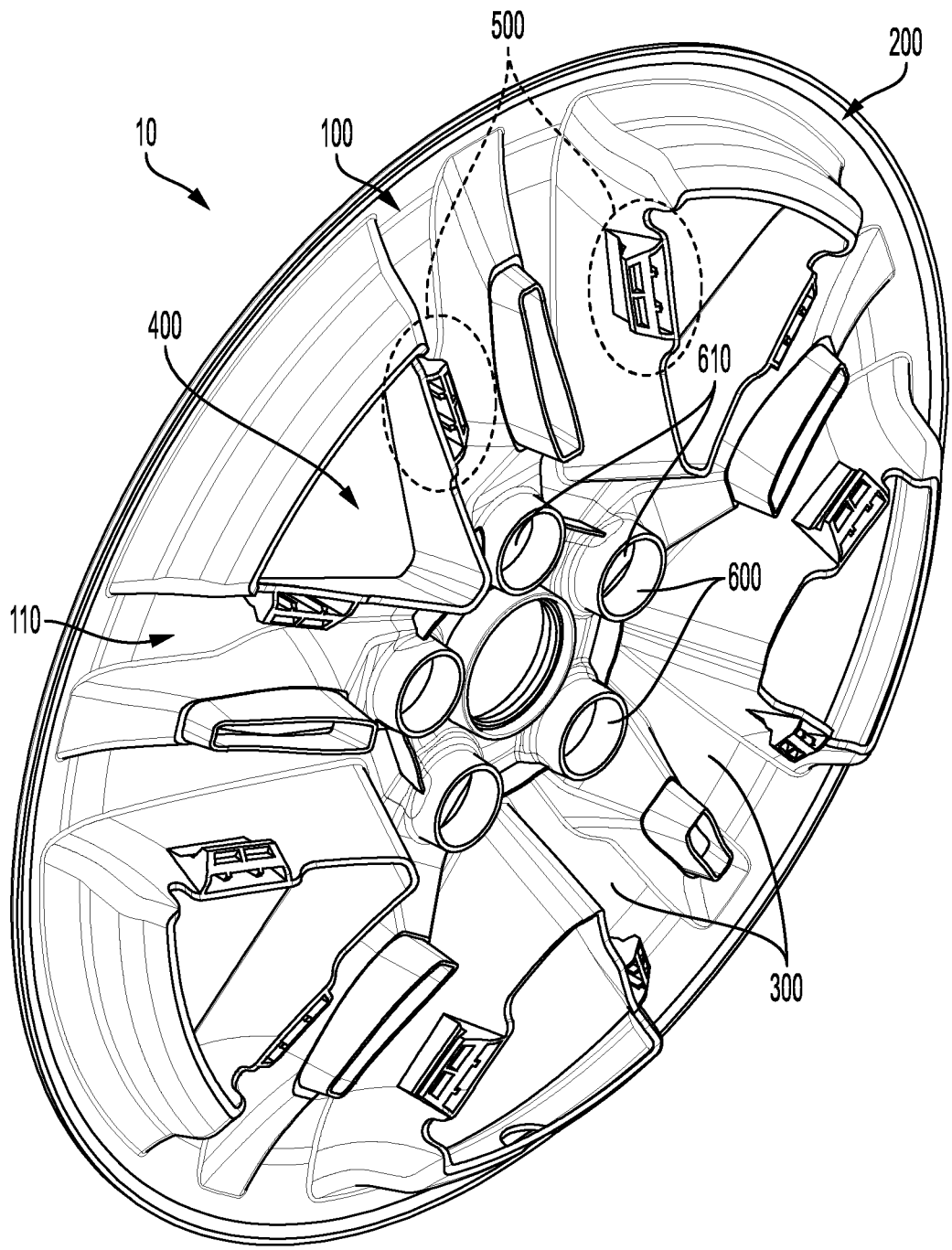
FIG. 2 is a rear perspective view of a wheel cover overlay.

FIG. 1 illustrates a front perspective view of a wheel cover overlay (10) with FIG. 2 illustrating a rear perspective view thereof. As shown in FIG. 1 and FIG. 2, the wheel cover overlay includes a peripheral boundary (100) which may have a generally circular profile. The peripheral boundary defines an inner surface ((110) in FIG. 2) and an outer surface ((120) in FIG. 1).

Figure 7:
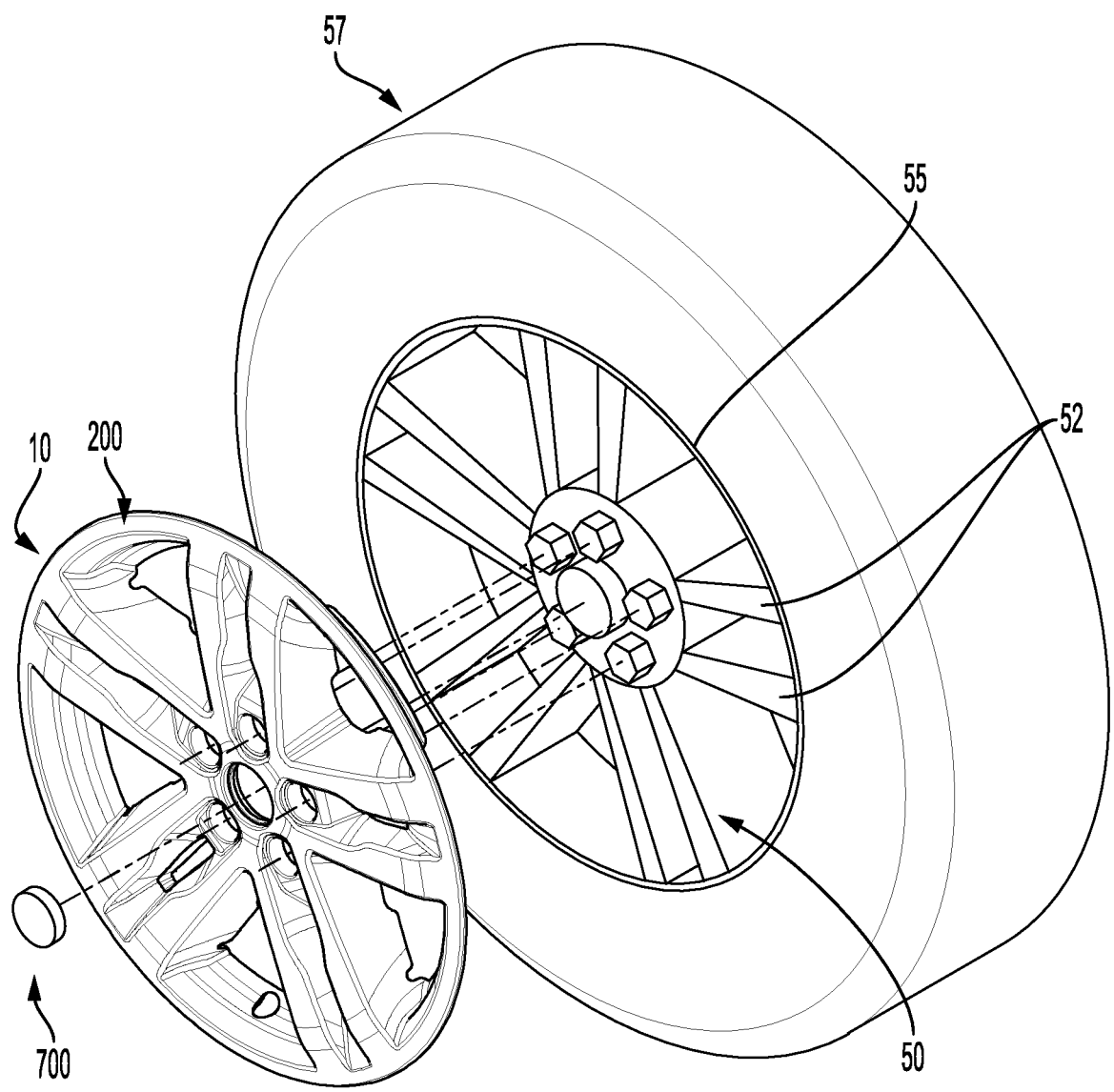
FIG. 7 is an exploded perspective view of a wheel cover overlay with a wheel.

A surround (200) extends from the peripheral boundary. The surround is preferably a piece of material integrally attached to the peripheral boundary and extending therefrom. The surround may function to ensure that the entirety of the outer periphery of the wheel ((50 as shown in FIG. 7) is covered by the wheel cover overlay (10) when the wheel cover overlay is attached to the wheel. When the wheel cover overlay is attached to a wheel—such as a vehicle wheel—as described herein, the wheel cover overlay and the extended surround portion preferably covers the entire surface of the wheel including the circumferential edge thereof as described herein and shown in the Figures. Said wheel may be with or without an existing hubcap, and the term "wheel" as used herein denotes a wheel without a hubcap. When the wheel does not include an existing hubcap, the wheel cover overlay may be configured to connect to the wheel itself using the clasp mechanisms described herein. When the wheel includes an existing hubcap (which may be in a damaged or undamaged condition), the wheel cover overlay may be configured to connect to one or both of the hubcap and/or the wheel itself using the clasp mechanisms described herein.

The surround (200) can be of any length; however, it is anticipated that the maximum length of the extended surround may be such that the wheel cover overlay—when installed—covers the entire wheel (50 as shown in FIG. 7). Preferably, no space is left between the circumferential edge of the wheel cover overlay with the surround and the circumferential edge of the wheel of the automobile when the former is snapped over the later to cover an existing wheel or wheel cover. However, in some embodiments, a small amount of space—preferably less than 2.5 mm in width, with less than 1.0 mm in width being more preferred, and 0.5 mm in width being still more preferred—may be left between the circumferential edge of the wheel cover overlay with the surround and the circumferential edge of the wheel of the automobile when the former is snapped over the later to cover an existing wheel or wheel cover.

The wheel cover overlay (10) also comprises a plurality of spokes (300) and a plurality of openings (400). As shown in FIG. 1 and FIG. 2, each opening of the plurality of openings passes from the outer surface (120) through the inner surface (110). As such, each opening may be thought of as a through hole. Each opening will be located between successive spokes of the plurality of spokes.

In some embodiments, the wheel cover overlay (10) may include a plurality of secondary spoke pairs (800) with a plurality of secondary openings (900) such as those shown in U.S. Pat. No. 11,254,160 the teachings of which are incorporated by reference herein in their entirety. When present, each secondary spoke of a secondary spoke pair may extend between a spoke terminal end of one spoke of the plurality of spokes and the peripheral boundary (100). As such, each secondary opening—when present—will pass from the outer surface through the inner surface and be located between two opposing secondary spokes of a secondary spoke pair. As such, each secondary opening may also be thought of as a through hole between opposing secondary spokes of a secondary spoke pair.

Figure 4:
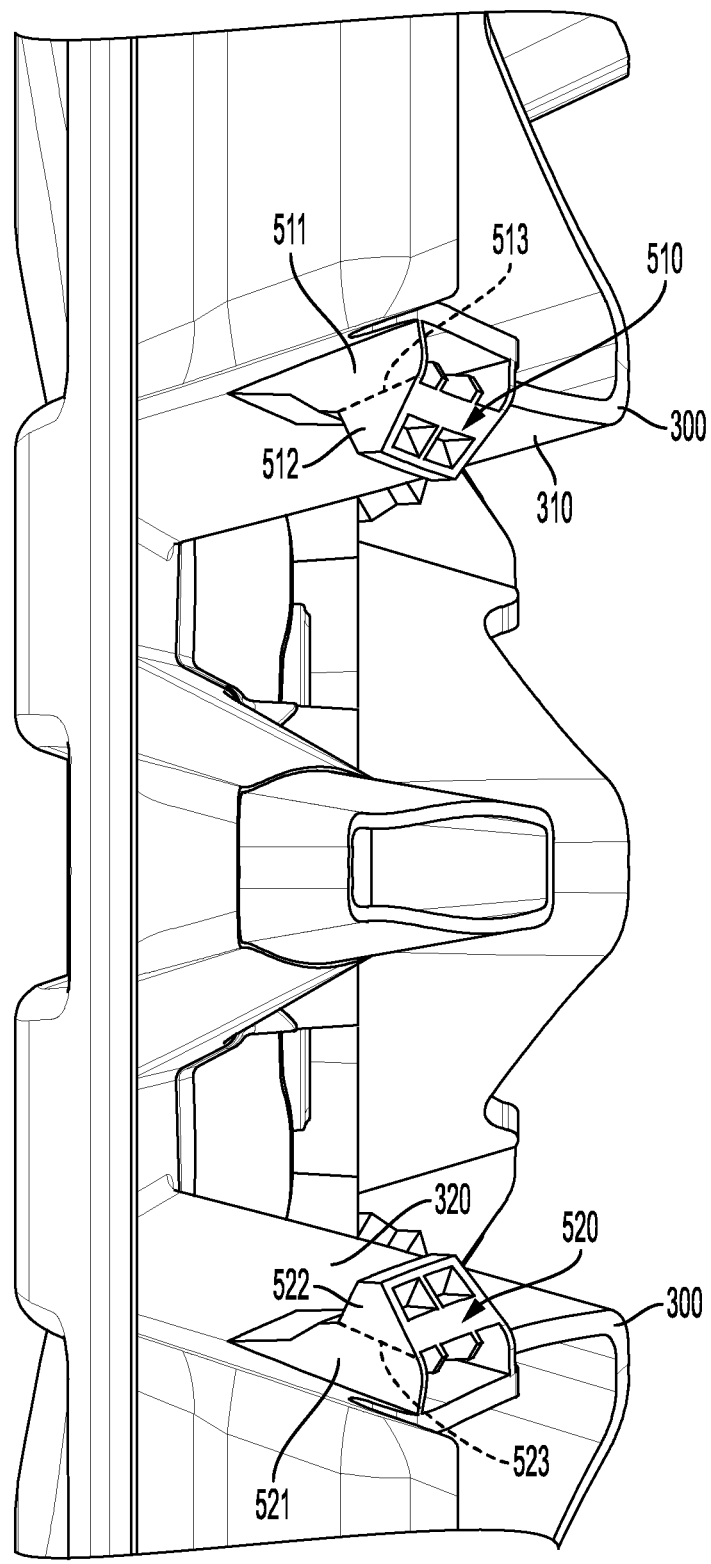
FIG. 4 is an end view of a clasp mechanism pair.

The wheel cover overlay (10) further comprises a plurality of clasp mechanism pairs (500), each of which is configured to secure the wheel cover overlay to a portion of a wheel (50 as shown in FIG. 7). While the wheel cover overlay may be secured to any surface of the wheel, the typical surface will be a wheel spoke or a secondary wheel spoke. The plurality of clasp mechanism pairs may come in many different forms, an exemplary embodiment of which is shown in FIG. 4 and further described herein. The clasp mechanisms allow the wheel cover overlay to "snap on" to the wheel by flexing outwardly over the spoke of the wheel as the wheel cover overlay is pressed on to the wheel and then returning to their normal shape to safely and securely engage around the spoke.

Figure 5:
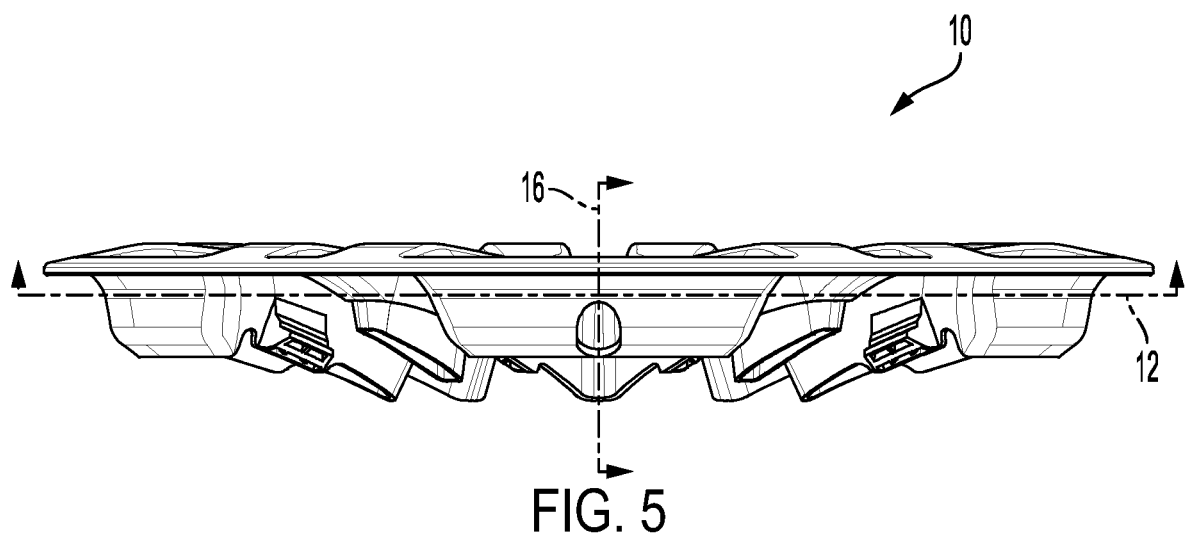
FIG. 5 is a side view of a wheel cover overlay.

In some embodiments, the wheel cover overlay (10) may further comprise a plurality of lug nut towers (600). When present, at least a portion of the lug nut towers may project inwardly from the inner surface (110). In addition, or instead of, certain embodiments may feature at least a portion of the lug nut towers projecting outwardly from the outer surface (120). Each lug nut tower may include a lug nut through hole (610) which passes through the lug nut tower and the wheel cover overlay including the inner surface and the outer surface. When present, each lug nut through hole may have a central vertical axis which is substantially parallel with the central vertical axis (16 as shown in FIG. 5) of the wheel cover overlay itself. Preferably, each lug nut tower of the plurality of lug nut towers will be located on the wheel cover overlay at a position which substantially aligns with a lug nut and stud assembly of the wheel to which the wheel cover overlay may be attached as shown in the Figures.

Figure 3:
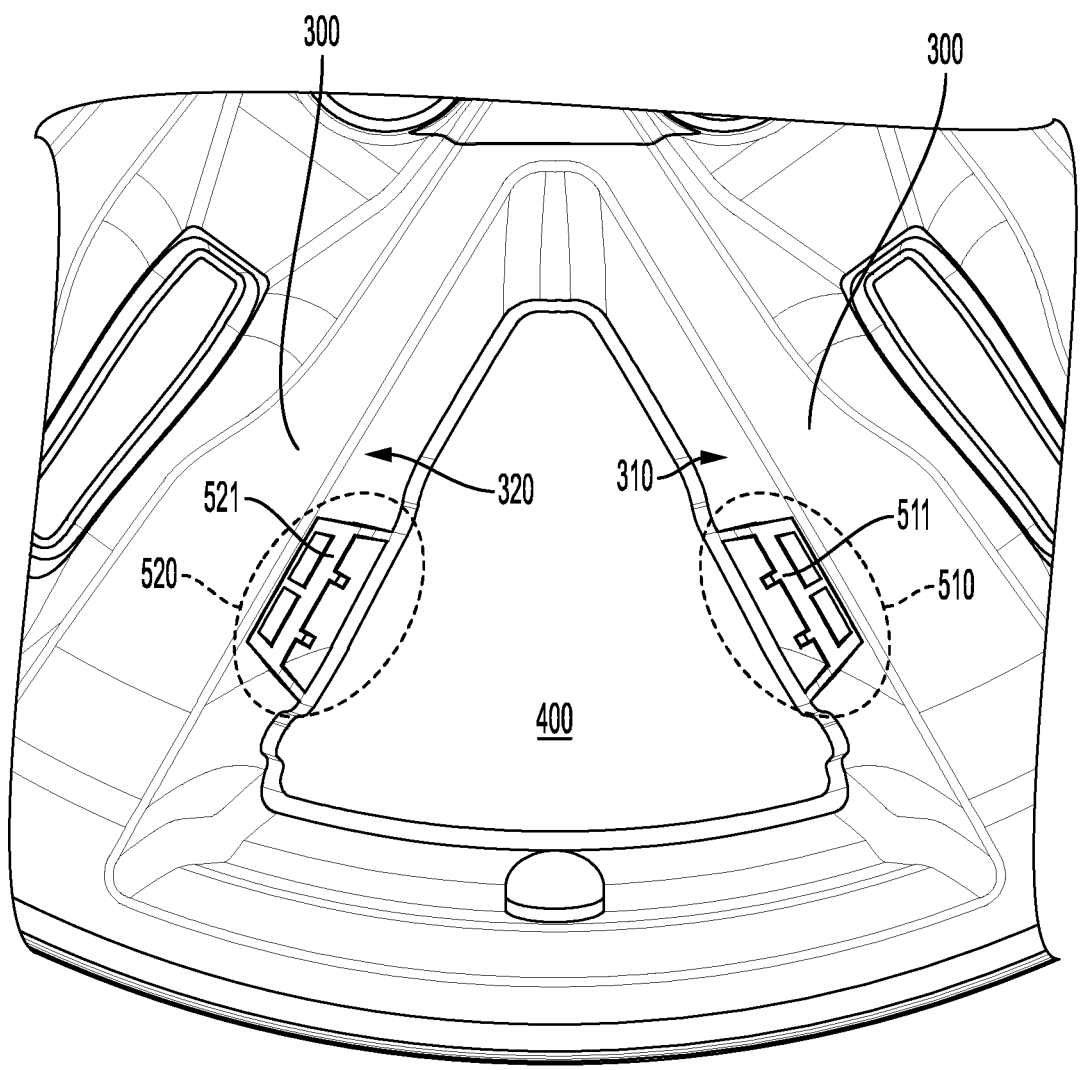
FIG. 3 is a rear view of spokes of a wheel cover overlay having a clasp mechanism pair.

FIG. 3 shows a close-up rear view of two spokes of a plurality of spokes (300) with an opening (400) therebetween. As shown in FIG. 3, a first clasp mechanism (510) of a clasp mechanism pair (500) is located on a first edge (310) of one of the two spokes while a second clasp mechanism (520) of the clasp mechanism pair is located on a second edge (320) of the succeeding spoke of the two spokes.

FIG. 4 shows an end view of an exemplary embodiment of a clasp mechanism pairs (500). As shown in FIG. 4, the first clasp mechanism (510) of each clasp mechanism pair may comprise a first tab (511) which extends inwardly from the first edge (310) of one of the two spokes. A first lip (512) may be located at a first tab distal end (513).

Similarly, the second clasp mechanism (520) of each clasp mechanism pair (500) may comprise a second tab (521) which extends inwardly from the second edge (320) of the succeeding spoke. A second lip (522) may be located at a second tab distal end (523). The first clasp mechanism (510) and the second clasp mechanism are preferably integrally connected to their respective spokes such as by molding the spokes and the clasp mechanisms of a single integral piece of material. When a user installs the wheel cover overlay (10) to a wheel (50), the first clasp mechanism and the second clasp mechanism each flex outwardly around the wheel spoke until the corresponding first tab (511) and second tab have passed the wheel spoke. At which point the flexible material of the wheel cover overlay—including the clasp mechanisms—allows the clasp mechanisms to flex or "snap" back to their original position with the tabs of the clasp mechanism behind the wheel spokes to assist in safely and securely engaging around the spoke.

Figure 6:
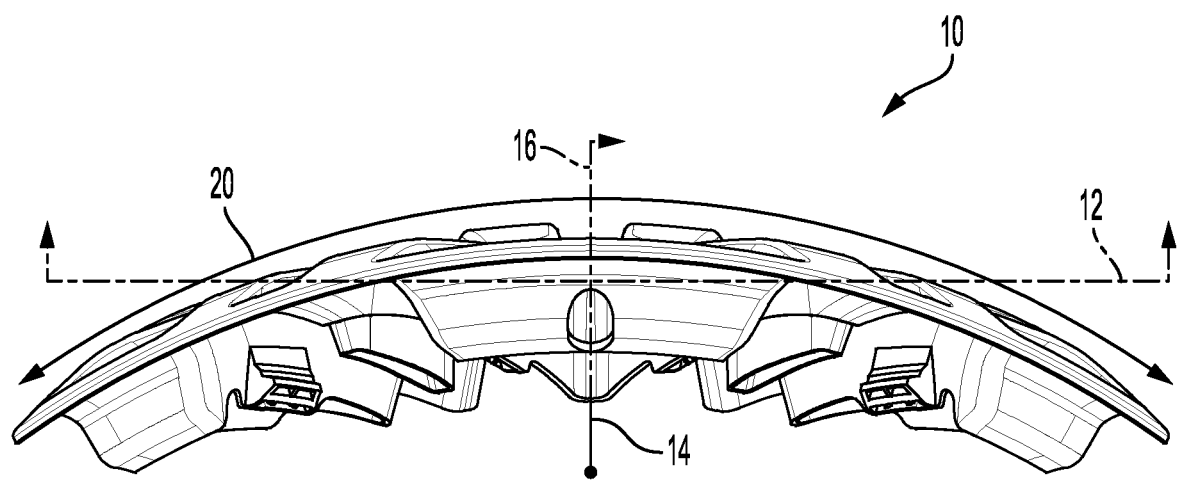
FIG. 6 is a side view of a wheel cover overlay forming a first degree of curvature.

The wheel cover overlay (10) is made of a flexible material which is illustrated in FIG. 5 and FIG. 6. For purposes of the patent, flexible refers to the ability of the wheel cover overlay to bend upon application of two forces applied in the same direction about two points of the peripheral boundary (100) of the wheel cover overlay around a central horizontal axis (12) while an axis perpendicular to the central horizontal axis—which may be the central vertical axis (16)—remains fixed in place. Preferably, the combined force will be in the order of magnitude of that which may be applied by human hands and arms and may be in a range selected from the group consisting of between 20 N and 500 N, between 20 N and 400 N, between 20 N and 300 N, between 20 N and 200 N, between 20 N and 100 N, between 20 N and 50 N, between 50 N and 500 N, between 50 N and 400 N, between 50 N and 300 N, between 50 N and 200 N, and between 50 N and 100 N. When the force is released, the wheel cover overlay may substantially or fully return to an unbent state. FIG. 5 and FIG. 6 illustrate the flexible nature of the wheel cover overlay.

In FIG. 5, the wheel cover overlay (10) is shown in an unbent state. As shown in FIG. 5, the wheel cover overlay includes a central horizontal axis (12) and a central vertical axis (16). In FIG. 6, the wheel cover overlay (10) is shown in a bent state in which a force has been applied—preferably of the magnitude which may be applied by a human hand—to opposing sides of the wheel cover overlay along the central horizontal axis as described herein. Application of said force results in the wheel cover overlay forming a first degree of curvature (20) or first angle with at least one of the opposing sides bending or arcing away from the central horizontal axis.

The flexible material of the wheel cover overlay (10) may also be characterized with reference to a modulus of elasticity. Preferably, the wheel cover overlay will be made of a material having a modulus of elasticity in a range selected from the group consisting of between 2,000 and 2,500 Mpa, between 2,000 and 2,400 Mpa, between 2,000 and 2,300 Mpa, and between 2,000 and 2,200 Mpa when measured at 2.8 mm/min according to ASTM D790-17-Standard Test Methods for Flexural Properties of Unreinforced and Reinforced Plastics and Electrical Insulating Materials (Jul. 24, 2017). Examples of such materials include some grades of nylon, polypropylene, polyetheretherketone, and low-density polyethylene.

One example of a material from which the wheel cover overlay (10) may be constructed is a blend of polyphenyl ether (PPE) and a polyamide (PA). In such blends, polyphenyl ether (PPE) may be present in any amount in a range of between 55% by weight and 90% by weight of all components of the blend while polyamide (PA) may be present in any amount in a range of between 10% by weight and 45% by weight of all components of the blend with all components of the blend-including polyphenyl ether (PPE) and polyamide (PA) totaling 100% by weight of the material used to construct the wheel cover overlay.

Figure 8:
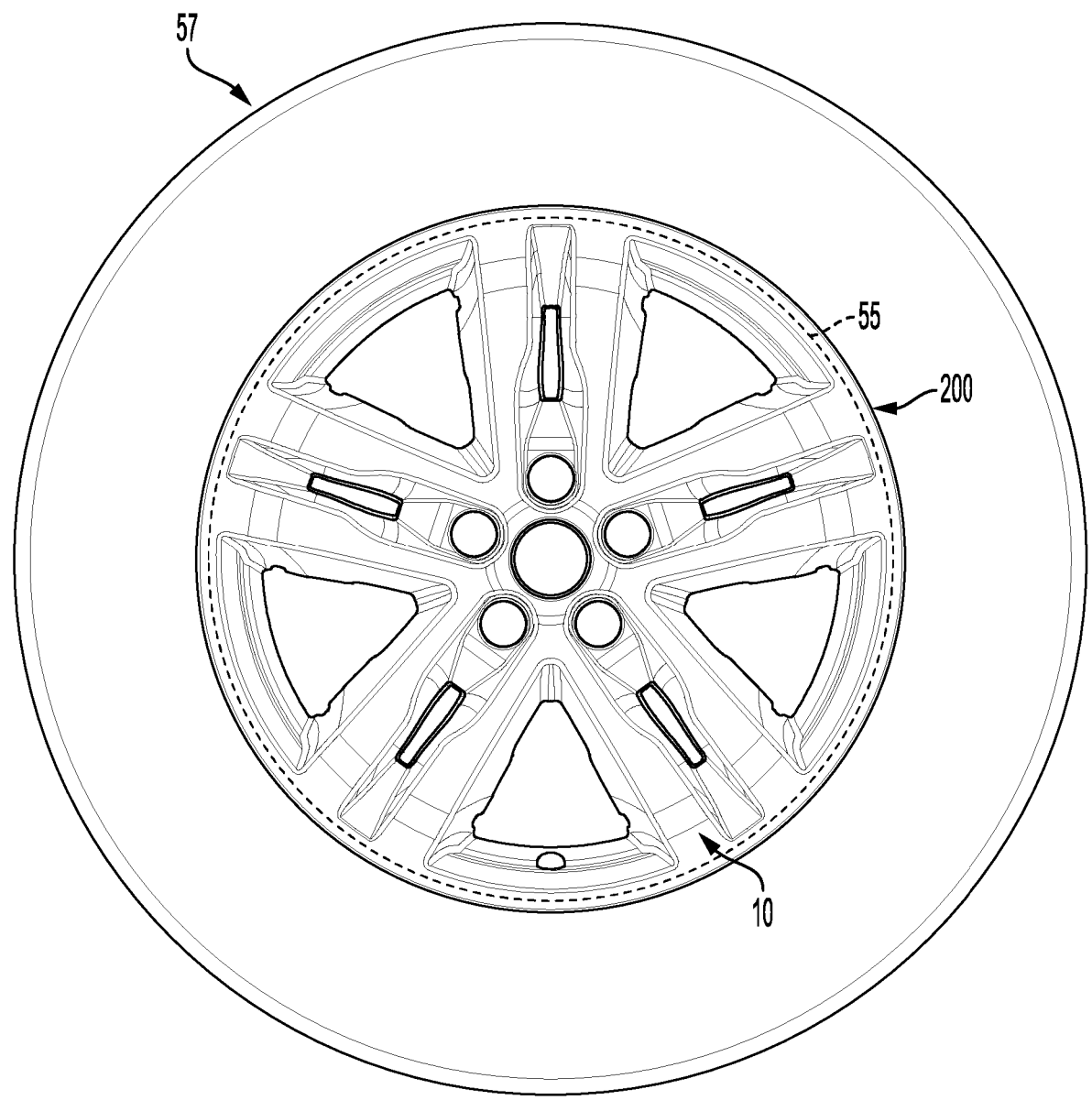
FIG. 8 is a front view of a wheel cover overlay installed on a wheel.

FIG. 7 illustrates an exploded perspective view of a wheel cover overlay (10) along with a wheel (50) which in this case is a standard passenger vehicle wheel having a tire (57) mounted thereto. The wheel has a generally circular profile including a circumferential edge (55). Preferably, the surround (200) has a circumference which is greater than the circumference of the wheel such that the extended surround is configured to extend past the circumferential edge of the wheel when the wheel cover overlay is attached to the wheel by the plurality of clasp mechanism pairs (500 as shown in FIG. 2). The surround extending past the circumferential edge of the wheel is illustrated in FIG. 8 which is a front view of the wheel cover overlay attached to a wheel.

FIG. 7 also illustrates a center rotation device (700) which may be of the type disclosed in U.S. Pat. No. 11,254,160—the teachings of which are incorporated by reference herein in their entirety. When the center rotation device is inserted into a hole passing through the central vertical axis (16 as shown in FIG. 5) of the wheel and turned in a clockwise direction, tension tabs expand outward and rest within a cavity of the wheel (50) thereby securing the wheel cover overlay (10) to the wheel.

Figure 9:
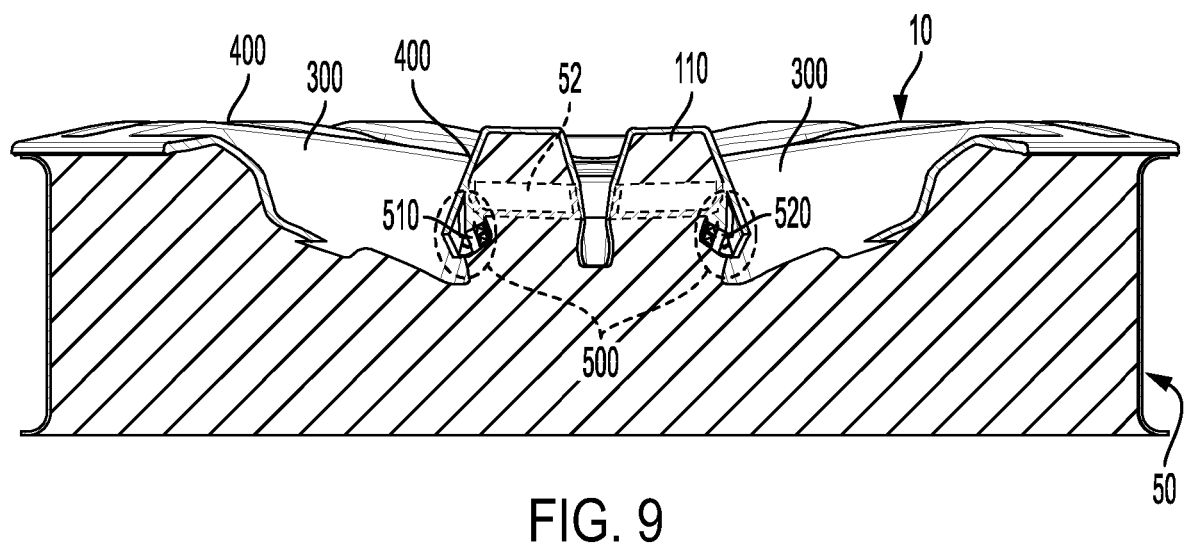
FIG. 9 is a cross section view of a wheel cover overlay installed on a wheel.

FIG. 9 illustrates in cross section the wheel cover overlay (10) connected to a wheel (50)—which may be a vehicle wheel—by the plurality of clasp mechanism pairs (500). As shown in FIG. 9, the clasp mechanism pairs connect the wheel cover overlay to the wheel with the tabs (511/521) engaging at least a portion of the opposing edges of a wheel spoke (52) and the lips (512/522) extending around and engaging a rear surface of said wheel spoke to prevent the wheel cover overlay from disengaging with the wheel when a force is applied to the wheel cover overlay in a direction away from the wheel substantially parallel with the central vertical axis (16). This occurs as the clasp mechanism pairs flex outwardly over and around the spoke of the wheel and then return or "snap" back to their normal shape once the tabs have passed the surface of the spoke.

When the wheel cover overlay (10) is connected to the wheel (50), the surround (200) extends past the circumferential edge (55) of the wheel as shown in FIG. 9. As such, the wheel cover overlay-when installed on a wheel-preferably covers at least 95% of the visible outer surface of the wheel (including the circumferential edge). More preferably, the wheel cover overlay—when installed on a wheel—covers at least 97.5% of the visible outer surface of the wheel (including the circumferential edge). Still more preferably, the wheel cover overlay—when installed on a wheel—covers at least 99% of the visible outer surface of the wheel (including the circumferential edge). Most preferably, the wheel cover overlay—when installed on a wheel—covers the entire (100%) of the visible outer surface of the wheel (including the circumferential edge).

Figure 10:
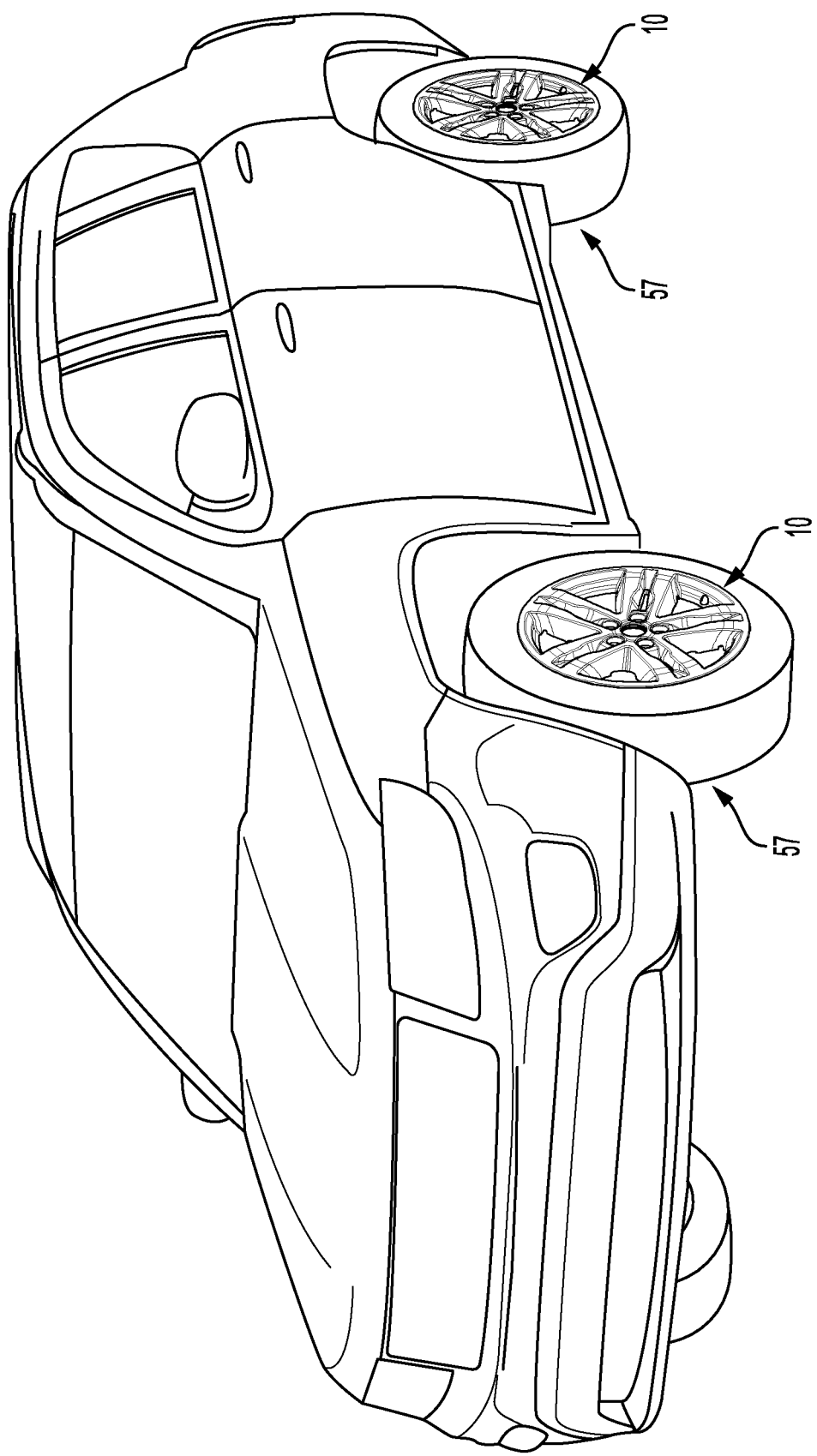
FIG. 10 is a perspective view of a wheel cover overlay installed on a wheel which is installed on a vehicle.
Figure 11:
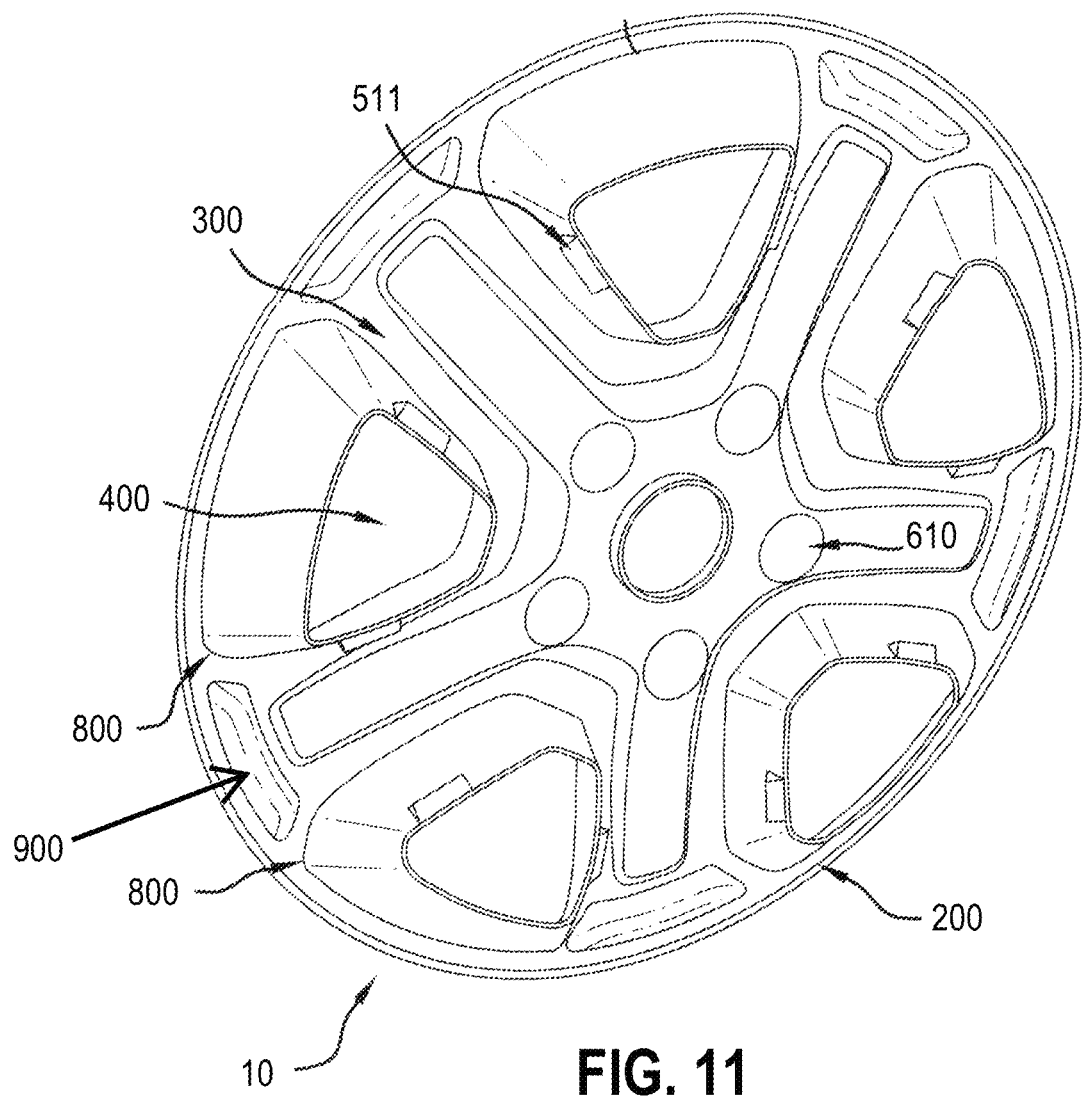
FIG. 11 is a perspective view of a wheel cover overlay.

FIG. 10 illustrates a vehicle with a wheel cover overlay (10) of the type described herein installed on one of the vehicle's wheels (50). As shown in FIG. 10, a wheel cover overlay has been installed on both the left-front and left-rear wheel of the vehicle. However, it is understood that individual wheel cover overlays may be installed on all or any subset of the total number of wheels (including the traditional left-front, right-front, left-rear, and right-rear wheels as well as any spare wheels) of the vehicle.

The wheel cover overlays described herein reduce or eliminate the breakage issues encountered in the prior art. By providing a wheel cover overlay which is partially or entirely made of the material described and characterized herein, the wheel cover overlay described may flex and bend during installation and operation while still maintaining a safe and secure connection to the vehicle wheel. In doing so, the wheel cover overlays described herein are less prone to breakage during installation and operation.

While the wheel cover overlay has been described as having one or more exemplary designs, the present article may be further modified within the spirit and scope of this disclosure. This application is therefore intended to cover any variations, uses, or adaptations of the wheel cover overlay using its general principles.

What is claimed is:

1. A wheel cover overlay (10) comprising:
a peripheral boundary (100) defining an inner surface (110) and an outer surface (120);
a surround (200) extending from the peripheral boundary;
a plurality of spokes (300) and a plurality of openings (400), each opening of the plurality of openings passing from the outer surface through the inner surface and located between successive spokes of the plurality of spokes;
a plurality of clasp mechanism pairs (500) extending from the inner surface with a first clasp mechanism (510) of each clasp mechanism pair located on a first edge (310) of one flange spoke and a second clasp mechanism (520) of each clasp mechanism pair located on a second edge (320) of a succeeding spoke; and
wherein the wheel cover overlay is made of a flexible material and is capable of forming a first degree of curvature (20) or first angle with at least one of two opposing sides of the wheel cover overlay arcing or bending away from a central horizontal axis (12) of the wheel cover overlay upon application of two forces applied in the same direction about two points of the peripheral boundary along the central horizontal axis while an axis perpendicular to the central horizontal axis remains fixed in place, wherein the two forces combined are in a range selected of between 20 N and 500 N.

2. The wheel cover overlay of claim 1, wherein the surround is configured to extend past a circumferential edge (55) of a wheel (50) when the wheel cover overlay is attached to said wheel by the plurality of clasp mechanism pairs.

3. The wheel cover overlay of claim 1, further comprising a plurality of secondary spoke pairs and a plurality of secondary openings with each secondary spoke extending between a spoke terminal end and the peripheral boundary, and each secondary opening passing from the outer surface through the inner surface and located between two opposing secondary spoke of a secondary spoke pair.

4. The wheel cover overlay of claim 1, wherein the first clasp mechanism of each clasp mechanism pair comprises a first tab (511) extending inwardly from the first edge, said first tab comprising a first lip (512) located at a first tab distal end (513).

5. The wheel cover overlay of claim 1, wherein the second clasp mechanism of each clasp mechanism pair comprises a second tab (521) extending inwardly from the second edge, said second tab comprising a second lip (522) located at a second tab distal end (523).

6. The wheel cover overlay of claim 1, further comprising a plurality of lug nut towers (600) with each lug nut tower of the plurality of lug nut towers comprising a lug nut through hole (610).

7. The wheel cover overlay of claim 1, further comprising a center rotation device (700) configured to insert into a hole passing through the central vertical axis, said center rotation device having a plurality of tension tabs which expand outwardly when the center rotation device is turned in a clockwise direction within the hole passing through the central vertical axis.

8. The wheel cover overlay of claim 2, wherein the first clasp mechanism of each clasp mechanism pair comprises a first tab (511) extending inwardly from the first edge, said first tab comprising a first lip (512) located at a first tab distal end (513).

9. The wheel cover overlay of claim 2, wherein the second clasp mechanism of each clasp mechanism pair comprises a second tab (521) extending inwardly from the second edge, said second tab comprising a second lip (522) located at a second tab distal end (523).

10. The wheel cover overlay of claim 8, wherein the second clasp mechanism of each clasp mechanism pair comprises a second tab (521) extending inwardly from the second edge, said second tab comprising a second lip (522) located at a second tab distal end (523).

11. A wheel cover overlay (10) comprising:
a peripheral boundary (100) defining an inner surface (110) and an outer surface (120);
a surround (200) extending from the peripheral boundary;
a plurality of spokes (300) and a plurality of openings (400), each opening of the plurality of openings passing from the outer surface through the inner surface and located between successive spokes of the plurality of spokes;
a plurality of clasp mechanism pairs (500) extending from the inner surface with a first clasp mechanism (510) of each clasp mechanism pair located on a first edge (310) of one spoke and a second clasp mechanism (520) of each clasp mechanism pair located on a second edge (320) of a succeeding spoke; and
wherein the wheel cover overlay is made of a flexible material having a modulus of elasticity in a range of between 2,000 and 2,500 Mpa when measured at 2.8 mm/min according to ASTM D790-17.

12. The wheel cover overlay of claim 11, wherein the surround is configured to extend past a circumferential edge (55) of a wheel (50) when the wheel cover overlay is attached to said wheel by the plurality of clasp mechanism pairs.

13. The wheel cover overlay of claim 11, further comprising a plurality of secondary spoke pairs and a plurality of secondary openings with each secondary spoke extending between a spoke terminal end and the peripheral boundary, and each secondary opening passing from the outer surface through the inner surface and located between two opposing secondary spokes of a secondary spoke pair.

14. The wheel cover overlay of claim 11, wherein the first clasp mechanism of each clasp mechanism pair comprises a first tab (511) extending inwardly from the first edge, said first tab comprising a first lip (512) located at a first tab distal end (513).

15. The wheel cover overlay of claim 11, wherein the second clasp mechanism of each clasp mechanism pair comprises a second tab (521) extending inwardly from the second edge, said second tab comprising a second lip (522) located at a second tab distal end (523).

16. The wheel cover overlay of claim 11, further comprising a plurality of lug nut towers (600) with each lug nut tower of the plurality of lug nut towers comprising a lug nut through hole (610).

17. The wheel cover overlay of claim 11, further comprising a center rotation device (700) configured insert into a hole passing through a central vertical axis (16) of the wheel cover overlay, said center rotation device having a plurality of tension tabs which expand outwardly when the center rotation device is turned in a clockwise direction within the hole passing through the central vertical axis.

18. The wheel cover overlay of claim 12, wherein the first clasp mechanism of each clasp mechanism pair comprises a first tab (511) extending inwardly from the first edge, said first tab comprising a first lip (512) located at a first tab distal end (513).

19. The wheel cover overlay of claim 12, wherein the second clasp mechanism of each clasp mechanism pair comprises a second tab (521) extending inwardly from the second edge, said second tab comprising a second lip (522) located at a second tab distal end (523).

20. The wheel cover overlay of claim 18, wherein the second clasp mechanism of each clasp mechanism pair comprises a second tab (521) extending inwardly from the second edge, said second tab comprising a second lip (522) located at a second tab distal end (523).

* * * * *